(12) United States Patent
Kagawa et al.

(10) Patent No.: US 8,079,285 B2
(45) Date of Patent: Dec. 20, 2011

(54) ROBOT

(75) Inventors: Ryuta Kagawa, Fukuoka (JP); Yoshiaki Miyazono, Fukuoka (JP); Takayuki Imanaka, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 199 days.

(21) Appl. No.: 12/499,083

(22) Filed: Jul. 7, 2009

(65) Prior Publication Data
US 2010/0000364 A1 Jan. 7, 2010

Related U.S. Application Data

(63) Continuation of application No. PCT/JP2007/075271, filed on Dec. 28, 2007.

(30) Foreign Application Priority Data

Jan. 9, 2007 (JP) ................ P.2007-001757

(51) Int. Cl.
*B25J 18/00* (2006.01)
(52) U.S. Cl. ................................... 74/490.1
(58) Field of Classification Search ........... 74/490.01, 74/490.02, 490.05, 490.06, 490.07; 901/19, 901/27, 28, 29, 30, 41, 42
See application file for complete search history.

(56) References Cited

U.S. PATENT DOCUMENTS

| | | | | |
|---|---|---|---|---|
| 5,881,604 A * | 3/1999 | Miwa | ............... | 74/490.05 |
| 6,795,750 B2 * | 9/2004 | Kullborg | ............... | 700/245 |
| 2004/0261562 A1 * | 12/2004 | Haniya et al. | ............... | 74/490.02 |
| 2005/0189333 A1 * | 9/2005 | Nakagiri et al. | ............... | 219/125.1 |
| 2005/0193854 A1 | 9/2005 | Sanemasa | | |
| 2006/0000817 A1 * | 1/2006 | Inoue et al. | ............... | 219/125.1 |

FOREIGN PATENT DOCUMENTS

| | | |
|---|---|---|
| JP | 11-170184 | 6/1999 |
| JP | 2003-200376 | 7/2003 |
| JP | 2004-306072 | 11/2004 |
| JP | 2004-338071 | 12/2004 |
| JP | 2004-358649 | 12/2004 |
| JP | 2005-246532 | 9/2005 |

OTHER PUBLICATIONS

Japanese Office Action for corresponding JP Application No. 2008-525291, Jul. 14, 2010.

* cited by examiner

*Primary Examiner* — Vicky Johnson
(74) *Attorney, Agent, or Firm* — Ditthavong Mori & Steiner, P.C.

(57) ABSTRACT

A robot includes a work tool, an arm, a cable, and a third member. The work tool is configured to perform a predetermined work with respect to a workpiece. The work tool is attached to the wrist. The arm supports the wrist and is rotatable around a rotational axis. The arm includes first and second members which are provided substantially in parallel to each other in a longitudinal direction of the arm to form a space between the first and second members. The cable extends through the space and is connected to the work tool. The third member connects the first and second members.

16 Claims, 4 Drawing Sheets

ROBOT

CROSS-REFERENCES TO RELATED APPLICATIONS

The present application relates to PCT patent application Ser. No. PCT/JP2007/075271, filed Dec. 28, 2007, entitled "Robot", and to Japanese Patent application No. 2007-001757, filed Jan. 9, 2007, entitled "Industrial Robot", all of which are incorporated herein by reference in their entirety.

BACKGROUND OF THE INVENTION

1. Field of the Invention

The present invention relates to a robot.

2. Description of the Related Art

A robot is suggested in which an arm is bi-forked, and a conduit cable extends toward a wrist through a space between two members extending in parallel to each other (e.g., see Japanese Patent Laid-Open Publication No. 2003-200376). Also, a robot is suggested in which one of the members of the arm supports the wrist in a cantilevered manner (e.g., see Japanese Patent Laid-Open Publication No. 2004-306072). The contents of these patent publications are incorporated herein by reference in their entirety.

SUMMARY OF THE INVENTION

According to one aspect of the present invention, a robot includes a work tool, an arm, a cable, and a third member. The work tool is configured to perform a predetermined work with respect to a workpiece. The work tool is attached to the wrist. The arm supports the wrist and is rotatable around a rotational axis. The arm includes first and second members which are provided substantially in parallel to each other in a longitudinal direction of the arm to form a space between the first and second members. The cable extends through the space and is connected to the work tool. The third member connects the first and second members.

BRIEF DESCRIPTION OF THE DRAWINGS

The present invention will be described in further detail with reference to the accompanying drawings wherein.

DESCRIPTION OF THE EMBODIMENTS

First Embodiment

Figure 1:
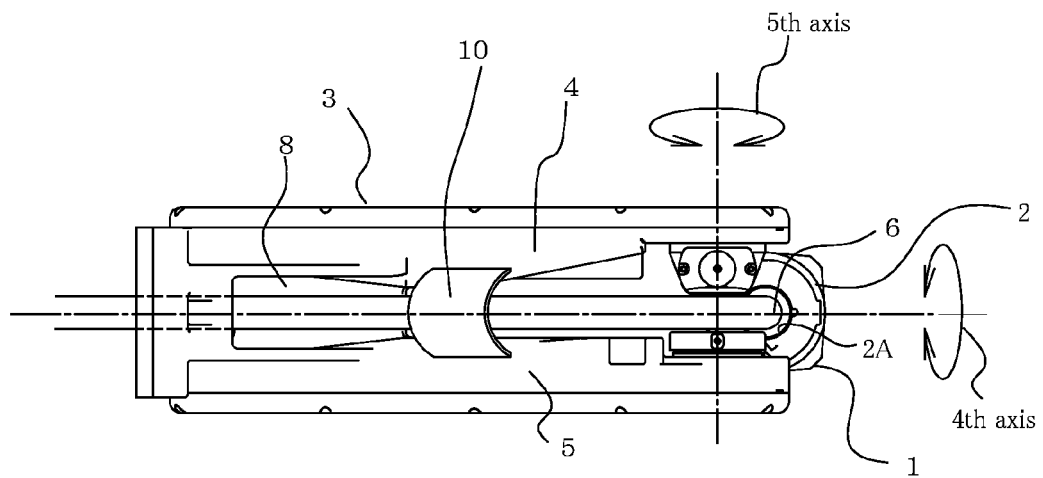
FIG. 1 is a top view showing an arm of a robot according to a first embodiment of the present invention.
Figure 2:
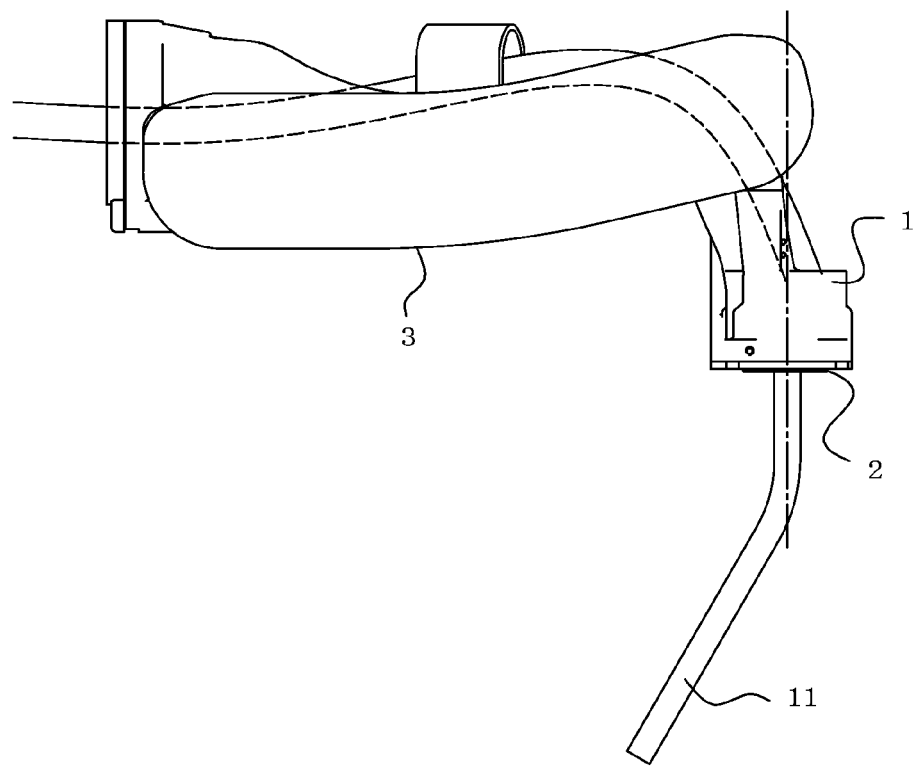
FIG. 2 is a side view showing the arm of the robot according to the first embodiment.
Figure 3:
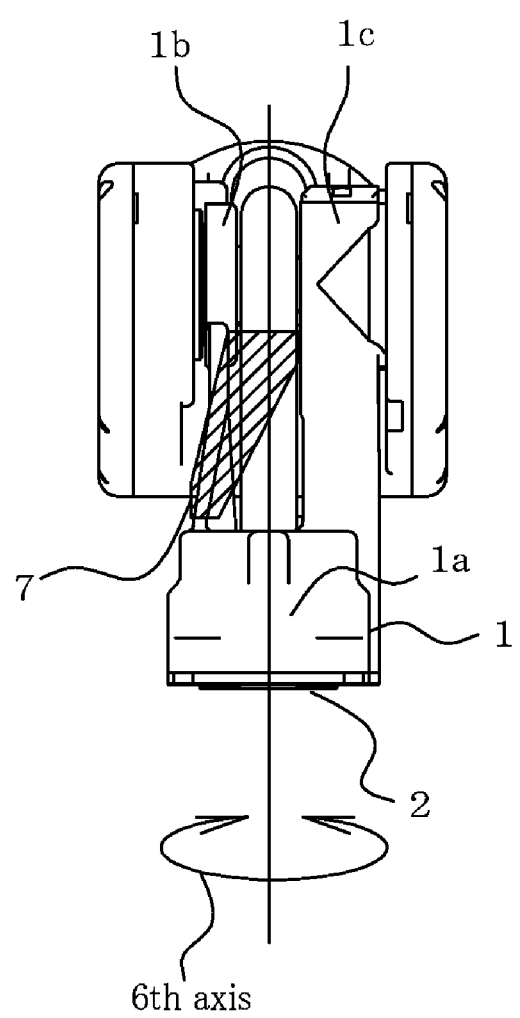
FIG. 3 is a front view showing the arm of the robot according to the first embodiment.

FIG. 1 is a top view showing an arm and a wrist of this embodiment. FIGS. 2 and 3 are side and front views of the arm and the wrist.

In the figures, a first arm 3 is supported rotatably around a 4th axis. The first arm 3 includes at least a first base portion 8, a first member 4, and a second member 5. Here, the first base portion 8 is provided at a side of the first arm 3 farthest from a tip end of the first arm 3, and has a hollow part into which a conduit cable (described later) is inserted. The first member 4 and the second member 5 are arranged substantially in parallel to each other from the first base portion 8 along the 4th axis. The "parallel" state represents that a direction in which a long side of the first member 4 extends is parallel to a direction in which a long side of the second member 5 extends, and the "parallel" state does not mean a mathematically parallel state. That is, the "parallel" state does not completely exclude an error which is unavoidably produced in an industrial product, or an adjustment in design.

In particular, when the first arm 3 is viewed from its upper surface (FIG. 1), a side thereof farthest from the tip end is closed with the first base portion 8, and a side nearest to the tip end (a side nearest to a wrist support portion) is open. The first base portion 8 and the first and second members 4 and 5 form a bi-forked, substantially U shape.

A wrist 1 is provided at the tip end of the first arm 3. The wrist 1 supported rotatably around a 5th axis includes first and second wrist members 1b and 1c extending from a second base portion 1a along a 6th axis, and these components form a bi-forked, substantially U shape in a similar manner to the first arm.

A flange 2 is provided at a tip end of the second base portion 1a. The flange 2 rotates around the 6th axis, and has a hollow part 2A at its rotation center. In addition, a welding torch 11 (work tool, working means) is attached to the flange 2.

A conduit cable (cable) 6 is connected to the welding torch 11. The conduit cable 6 extends through the hollow part of the first base portion 8 of the first arm 3, extends to a space between the first and second members 4 and 5, extends through a space between the first and second wrist members 1b and 1c of the wrist 1, and then extends through the hollow part of the flange 2. The conduit cable 6 supplies an electric signal necessary for welding work, and also supplies a material. Accordingly, the welding work can be carried out.

A cable support 7 is fixed to the third wrist member 1b. The cable support 7 is a plate member for closing a gap between the first and second wrist members 1b and 1c. During operation of the robot, since the cable conduit makes various types of motions, the cable support 7 functions as a constraint piece that prevents the conduit cable 6 from protruding from the gap between the first and second wrist members 1b and 1c.

A reinforcement member (third member, fixing means) 10 is joined to upper sides of the first and second members 4 and 5 to bridge the first and second members 4 and 5. The reinforcement member 10 is provided such that a longitudinal direction of reinforcement member 10 is substantially perpendicular to the longitudinal direction of the first and second members 4 and 5. The "substantially perpendicular" state does not mean a mathematically perpendicular state. That is, the "substantially perpendicular" state includes an error which is unavoidably produced in an industrial product, or an adjustment in design.

The reinforcement member 10 has a substantially arch shape formed by smoothly bending a plate member. Referring to FIGS. 1 to 3, the reinforcement member 10 is attached so as to fix the first and second members 4 and 5 to each other such that a recessed part of the substantially arch shape faces a rotation center (the 4th axis that is the rotational axis) of the first arm 3. Here, the substantially arch shape has a larger bend radius than a radius of the cable. Though not shown, solid lubricant resin (a lubricant member) is provided at the recessed part. Also, an edge of a recessed surface of the reinforcement member 10 is largely chamfered. Both ends of the reinforcement member 10 are attached to the first member 4 and the second member 5 by welding.

Figure 4:
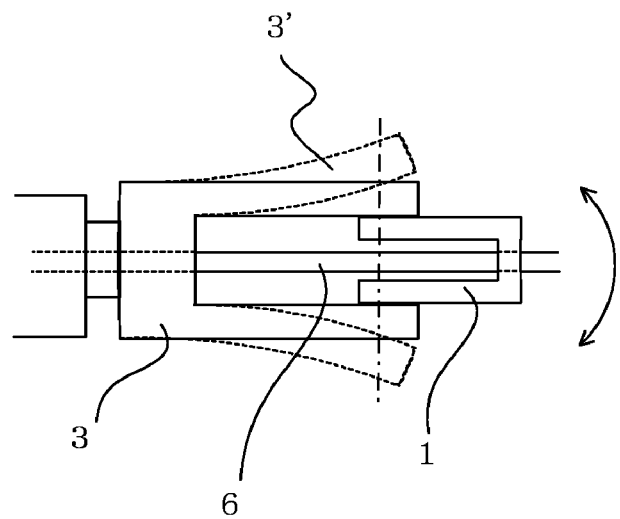
FIG. 4 is an explanatory view showing deflection of a tip end of the arm.

If the reinforcement member 10 is not provided, rigidity of the arm is low, and the tip end (the first and second members 4 and 5) of the first arm 3 is deflected as shown by an arm 3' in FIG. 4. Hence, the wrist 1 at the tip end is vibrated, resulting in that the welding torch is vibrated.

However, with the reinforcement member 10, the decrease in rigidity can be prevented. Further, since the reinforcement member 10 has the substantially arch shape, contact of the conduit cable 6 can be prevented maximally.

Still further, since the bend radius of the substantially arch shape is larger than the radius of the cable, the reinforcement member 10 would not pinch and damage the conduit cable 6. Yet further, since the recessed part is provided with the solid lubricant resin and the edge is chamfered, even when the conduit cable contacts the recessed part, the conduit cable 6 would not be damaged. Also, large chamfering at the edge attains an advantage similar to the above.

In the above-described embodiment, the reinforcement member 10 is provided at the upper side of the first and second members 4 and 5. However, reinforcement members 10 may be provided at both upper and lower sides. Also, the reinforcement member 10 has the substantially arch shape. However, the reinforcement member 10 does not have to have the substantially arch shape and may be merely a plate member. Even with the configuration, the vibration suppression effect can be provided. Alternatively, the reinforcement member 10 may be a channel member instead of the plate member. Accordingly, the rigidity can be further increased and the vibration suppression effect can be increased although the reinforcement member does not have the substantially arch shape.

Figure 5:
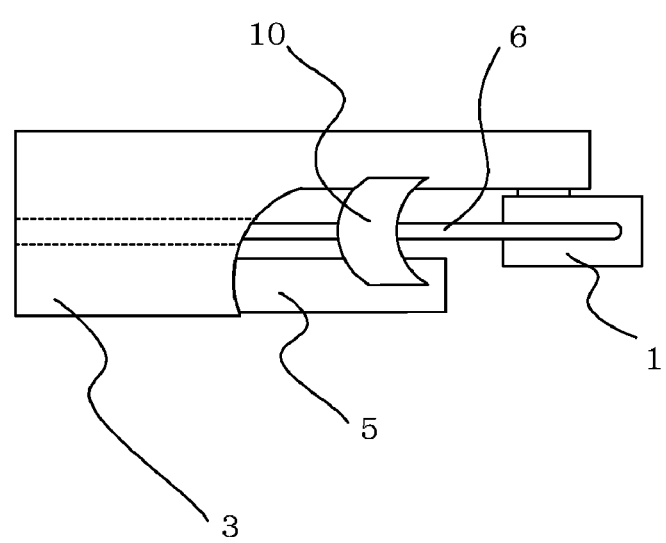
FIG. 5 is a top view showing an arm of an arc welding robot according to a modification of the first embodiment.

In the above-described embodiment, the first arm has a length substantially equal to that of the second arm in the longitudinal direction. However, in the case of the robot in which the arm (corresponding to the first member 4) supports the wrist in a cantilevered manner as disclosed in Japanese Patent Laid-Open Publication No. 2004-306072, the second member of the above-described embodiment may be provided substantially in parallel to the arm, thereby preventing a member of the arm from vibrating (FIG. 5). In this case, the second member may have a length capable of fixing the reinforcement member. In particular, the length of the second member is smaller than the length of the first member, and an end of the reinforcement member is fixed to the tip end of the second member.

With this embodiment, the vibration of the welding torch can be suppressed without the conduit cable being damaged while the advantage of preventing the conduit cable from interfering with the robot main body or the peripheral object is still provided.

Second Embodiment

Figure 6A:
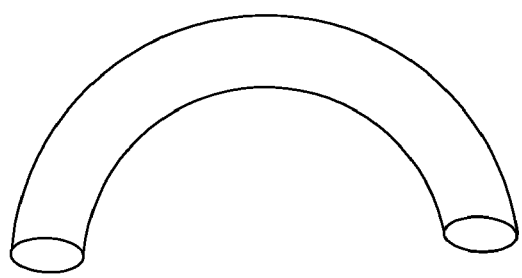
FIGS. 6A to 6C are perspective views showing reinforcement members according to a second embodiment of the present invention.

In this embodiment, referring to FIG. 6A, the reinforcement member 10 of the first embodiment is a substantially cylindrical member having a substantially cylindrical shape. The surface of the cylindrical member is provided with a lubricant member in a similar manner to the first embodiment.

Figure 6B:
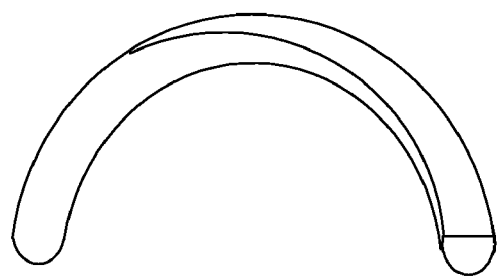
Figure 6C:
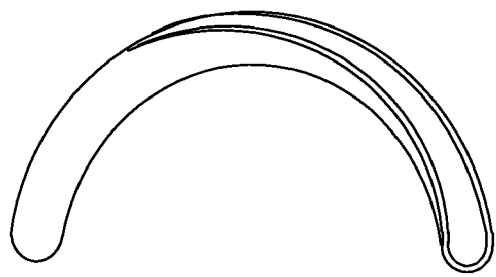

With this embodiment, the similar advantage to that of the first embodiment can be provided. Also, chamfering is not necessary. If the cylindrical member is a hollow cylindrical member (pipe shape), reduction in weight can be promoted. Alternatively, a member formed by cutting a cylindrical member or a pipe shape in a longitudinal direction as shown in FIG. 6B or 6C may be used. The substantially cylindrical member involves such a member, and may have any shape as long as the shape at the recessed part of the substantially arch shape is cylindrical.

Third Embodiment

In this embodiment, the reinforcement member 10 is attached by screwing instead of welding.

With this embodiment, the vibration suppression effect is decreased as compared with the case using welding according to the first embodiment. However, the reinforcement member may be easily attached or detached. Thus, the attachment or detachment of the reinforcement member would not disturb a maintenance operation of the conduit cable and the like. Since the attachment relies on screwing, reinforcement members 10 may be easily attached to a plurality of positions to increase the vibration suppression effect, although screwing provides a smaller effect as compared with the welding.

In the embodiments, the work tool is not limited to the welding torch, and various types of working tools may be applied. The work tool may be any type as long as the work tool is used for a predetermined work carried out by an industrial robot. The work tool may be, for example, a paint spray gun for painting, a sealing nozzle for sealing, a grinding tool for grinding, or a mechanical hand for handling. Furthermore, even when the structure of an arm nearer to a base than the first arm is desirably modified, the modification would not disturb implementation of the invention.

What is claimed is:

1. A robot comprising:
   a work tool configured to perform a predetermined work with respect to a workpiece;
   a wrist to which the work tool is attached;
   an arm which supports the wrist and is rotatable around a rotational axis, the arm comprising:
      first and second members which are provided substantially in parallel to each other in a longitudinal direction of the arm so that the first member faces the second member to form a space between the first and second members, the first and second members being fixed unrotatably to each other; and
      a base portion provided between the first member and the second member;
   a cable extending through the space and connected to the work tool; and
   a third member which connects the first and second members, the third member being fixed unrotatably to the first and second members,
   wherein the third member is provided at an intermediate position in the longitudinal direction of the arm, and at a location between the base portion and the wrist.

2. The robot according to claim 1, wherein the first member has a length in the longitudinal direction larger than a length of the second member in the longitudinal direction, and wherein the wrist is provided at the first member.

3. The robot according to claim 1, wherein the first member has a length in the longitudinal direction substantially equal to a length of the second member in the longitudinal direction, and wherein the wrist is supported by the first and second members.

4. The robot according to claim 1, wherein the third member is provided such that a longitudinal direction of the third member is substantially perpendicular to the longitudinal direction of the arm.

5. The robot according to claim 1, wherein the third member is provided at an upper side of the arm.

6. The robot according to claim 1, wherein the third member is provided at a lower side of the arm.

7. The robot according to claim 1, wherein the third member has a substantially arch shape formed by bending a plate member in a longitudinal direction of the plate member, and wherein one end of the third member is fixed to the first member, another end of the third member is fixed to the second member, and a intermediate portion of the third member between the one end and the another end is apart from a line connecting the one end and the another end.

8. The robot according to claim 7, wherein the third member is attached such that a recessed part of the substantially arch shape faces a rotation center of the arm.

9. The robot according to claim 8, wherein a lubricant member is provided at the recessed part of the third member.

10. The robot according to claim 7, wherein the substantially arch shape has a bend radius larger than a radius of the cable.

11. The robot according to claim 7, wherein an edge at the recessed part of the substantially arch shape is chamfered.

12. The robot according to claim 1, wherein the third member has a substantially arch shape formed by bending a member with a circular cross section, and wherein one end of the third member is fixed to the first member, another end of the third member is fixed to the second member, and a intermediate portion of the third member between the one end and the another end is apart from a line connecting the one end and the another end.

13. The robot according to claim 1, wherein the third member has a hollow structure.

14. The robot according to claim 1, wherein a lubricant member is provided on a surface of the third member.

15. The robot according to claim 1, wherein the third member is fixed to the first and second members by welding.

16. A robot comprising:
    work means for performing a predetermined work with respect to a workpiece;
    a wrist to which the work means is attached;
    an arm which supports the wrist and is rotatable around a rotational axis, the arm comprising:
        first and second members which are provided substantially in parallel to each other in a longitudinal direction of the arm so that the first member faces the second member to form a space between the first and second members, the first and second members are fixed unrotatably to each other; and
        a base portion provided between the first member and the second member;
    a cable extending through the space and connected to the work means; and
    means for connecting the first and second members fixed unrotatably to the first and second members,
    wherein the means for connecting the first and second members is provided at a location between the base portion and the wrist.

* * * * *